United States Patent
Silvano de Sousa et al.

(10) Patent No.: US 10,782,259 B2
(45) Date of Patent: Sep. 22, 2020

(54) DETERMINING A PHYSICAL QUANTITY WITH A NATIVE COMPONENT CARRIER

(71) Applicant: AT&S Austria Technologie & Systemtechnik Aktiengesellschaft, Leoben (AT)

(72) Inventors: Jonathan Silvano de Sousa, Vienna (AT); Marco Gavagnin, Leoben (AT)

(73) Assignee: AT&S Austria Technologie & Systemtechnik Aktiengesellschaft, Leoben (AT)

( * ) Notice: Subject to any disclaimer, the term of this patent is extended or adjusted under 35 U.S.C. 154(b) by 58 days.

(21) Appl. No.: 16/195,982

(22) Filed: Nov. 20, 2018

(65) Prior Publication Data
US 2019/0154617 A1    May 23, 2019

(30) Foreign Application Priority Data
Nov. 23, 2017   (EP) .................................... 17203331

(51) Int. Cl.
*G01N 27/22* (2006.01)
*G01K 7/34* (2006.01)
*H04Q 9/00* (2006.01)

(52) U.S. Cl.
CPC ............. *G01N 27/223* (2013.01); *G01K 7/34* (2013.01); *G01K 7/343* (2013.01); *H04Q 9/00* (2013.01); *H04Q 2209/47* (2013.01)

(58) Field of Classification Search
None
See application file for complete search history.

(56) References Cited

U.S. PATENT DOCUMENTS

| | | | |
|---|---|---|---|
| 8,024,970 B2 | 9/2011 | Zhang | |
| 9,128,136 B2* | 9/2015 | Wurzinger | G01R 27/2605 |
| 2007/0146980 A1 | 6/2007 | Ahn et al. | |
| 2009/0009193 A1 | 1/2009 | Hsiung et al. | |
| 2010/0177801 A1 | 7/2010 | Geren et al. | |
| 2010/0332171 A1* | 12/2010 | Ueno | G01D 5/266 |
| | | | 702/71 |
| 2012/0206147 A1 | 8/2012 | Sim et al. | |
| 2013/0010400 A1 | 1/2013 | McConnell et al. | |

(Continued)

FOREIGN PATENT DOCUMENTS

| | | |
|---|---|---|
| CN | 1357759 A | 7/2002 |
| CN | 2692663 Y | 4/2005 |

(Continued)

OTHER PUBLICATIONS

Notification of First Office Action in Application No. 201811406751.8; dated May 19, 2020, pp. 1-9; China National Intellectual Property Administration; No. 6, Xitucheng Lu, Jimenqiao Haidian District, Beijing City, 100088; China.

*Primary Examiner* — Jermele M Hollington
(74) *Attorney, Agent, or Firm* — Robert A. Blaha; Smith Tempel Blaha LLC (57) ABSTRACT

A method and a sensor arrangement for determining a physical quantity are illustrated and described. The described method includes stimulating a capacitor device within a native component carrier; measuring a capacitance value of the capacitor device; and determining the physical quantity based on the measured capacitance value. Further described is a method for using a native component carrier as a transducer for detecting a value of a physical quantity.

14 Claims, 4 Drawing Sheets

(56) References Cited

U.S. PATENT DOCUMENTS

| | | | |
|---|---|---|---|
| 2014/0266263 A1* | 9/2014 | Wurzinger | H04R 3/00 |
| | | | 324/686 |
| 2015/0169232 A1* | 6/2015 | Klemm | G06F 3/061 |
| | | | 711/114 |
| 2015/0355124 A1 | 12/2015 | Yazawa et al. | |
| 2016/0041211 A1* | 2/2016 | Wurzinger | H04R 19/005 |
| | | | 324/686 |
| 2016/0265984 A1 | 9/2016 | Peroulis et al. | |
| 2016/0266061 A1 | 9/2016 | Yu et al. | |
| 2018/0348277 A1* | 12/2018 | Haneda | B60R 16/0232 |
| 2019/0170589 A1* | 6/2019 | Yatsumonji | G01D 21/02 |

FOREIGN PATENT DOCUMENTS

| | | | |
|---|---|---|---|
| CN | 1677115 A | 10/2005 | |
| CN | 102944325 A | 2/2013 | |
| CN | 102998345 A | 3/2013 | |
| CN | 103543175 A | 1/2014 | |
| DE | 102015108079 A1 | 11/2015 | |

\* cited by examiner

DETERMINING A PHYSICAL QUANTITY WITH A NATIVE COMPONENT CARRIER

TECHNICAL FIELD

The present invention relates to a method and a sensor arrangement for determining a value of a physical quantity, to a method of controlling the operation of an electronic component as a function of the value of a physical quantity, and to a method of using a component carrier.

TECHNOLOGICAL BACKGROUND

In many applications, temperature and/or humidity control is a key factor to monitor physical and/or chemical processes. For instance, in automotive and/or electronic applications it is inconceivable to preserve the functionality of temperature and/or humidity sensitive equipment without having knowledge of actual temperatures and/or humidity levels. Other examples can be found in medical and/or veterinary applications. A secure and precise temperature control can help physicians to monitor and/or treat diseases such as localized infections in real time. Further, in industrial applications, temperature control may also be necessary to successfully realize energy saving measures while humidity readings can help in process optimization. In domestic and commercial applications, thermostats and hygrostats are frequently used to optimize the energy usage and environmental comfort of households and/or supermarkets, respectively.

For an accurate temperature and/or humidity control, smart thermometers and hygrometers of small size and low cost are needed. Such smart sensors can be easily integrated virtually in any environment. Thereby, cost, functionality and integration are the mandatory requirements. For the control of temperature and/or humidity at various positions inside of a large building, for example, many thermometers/hygrometers (sensors) are needed. In medical applications, where exact temperatures of different organs must be monitored, disposable and implantable capacitive thermometers can be used for remote, wireless and accurate temperature monitoring. Nevertheless, most state of the art thermometers and/or hygrometers are wired or need complex structures/methods to allow for remote temperature and/or humidity readings.

SUMMARY

There may be a need for providing a capacitive measurement principle for determining a physical quantity, which can be implemented with a sensing capacitor device which can be realized in a simple and cost effective manner.

This need may be met by the subject matter according to the independent claims. Advantageous embodiments of the present invention are described by the dependent claims.

According to a first aspect of the invention, a method for determining a value of a physical quantity is provided. The provided method includes (a) stimulating a capacitor device formed within a native component carrier; (b) measuring a capacitance value of the capacitor device; and (c) determining the actual value of the physical quantity based on the measured capacitance value.

The described method is based on the idea that a native component carrier can be directly used as a capacitive sensor for a physical quantity. Thereby, it is assumed that the capacitor device, which is intrinsic with regard to the native component carrier, exhibits a capacitance value which depends on the value of the physical quantity to be determined.

The idea underlying the invention is a completely unique approach because, in known capacitive sensing applications, an appropriate and/or dedicated capacitor is typically used as a sensor element. Of course, in some applications the capacitive sensor element is mounted on or at a component carrier. By contrast thereto, in accordance with the invention an intrinsic behavior of at least a part of the component carrier is used.

The described method comprises stimulating (or exciting) the capacitor device. This may in particular mean that an electric AC signal is applied to the electrodes of the capacitor device, in which the electrodes surround, enclose and/or encapsulate a dielectric material or layer. In view of the necessary stimulation, the capacitor device can be considered as to be a transducer part of a sensor or at least a part of a transducer, which converts the physical quantity to be measured via the capacitance value into a measurement signal being indicative for the physical quantity.

OVERVIEW OF EMBODIMENTS

In the context of this document the term "native" may particularly mean that for realizing the capacitor device no dedicated components are used. The (native) component is formed inside or on the carrier, possibly during the manufacture of the carrier and possibly with typical materials used in the manufacture of the carrier. In particular, apart from the usual layered structure of a component carrier comprising at least one dielectric layer being interposed between two neighboring metallic or conductive layers, the described native component carrier does not need any further sensing elements or sensing structures. This holds at least for realizing the function of determining the physical quantity. Of course, the described native component carrier can be used as a structure for building up an electronic assembly.

According to an embodiment of the invention the native component carrier is a printed circuit board. In the context of the present application, the term "printed circuit board" (PCB) may particularly denote a component carrier which is formed by laminating several electrically conductive layer structures with at least one electrically insulating layer structure, for instance by applying pressure, if desired accompanied by the supply of thermal energy. A PCB may be plate-shaped (i.e. planar), three-dimensionally curved (for instance when manufactured using 3D printing) or may have any other shape. A PCB may have a completely rigid structure. Alternatively, at least a portion of a PCB may be flexible e.g. in order to adapt a three dimensional shape of the PCB towards a desired shape.

The typical production format of the PCB cards, e.g. 60 cm×40 cm or formats for substrates for component packaging (500 mm×500 mm), in addition to the relative low costs of the materials involved can be used for realizing affordable sensors for physical quantities. Such sensors may be small enough to be implanted virtually in any structure. Such an integration may be carried out for instance in RFID systems, microprocessors, autonomous sensing units, etc.

As preferred materials for PCB technology, the electrically conductive layer structures are made of copper, whereas the electrically insulating layer structures may comprise resin and/or glass fibers, so-called prepreg or FR4 material. The various electrically conductive layer structures may be connected to one another in a desired way by forming through-holes through the laminate, for instance by laser drilling or mechanical drilling, and by filling them with electrically conductive material such as in particular copper, thereby forming vias as through-hole connections. A PCB is usually configured for accommodating one or more components on one or both opposing surfaces of the plate-shaped printed circuit board. They may be connected to the respective main surface by soldering. A dielectric part of a PCB may be composed of resin with reinforcing fibers such as e.g. glass fibers.

According to a further embodiment of the invention the capacitor device is formed by two electrically conductive layer portions and an electrically insulating layer portion being sandwiched between the two electrically conductive layer portions. The two electrically conductive layer portions overlap with each other at least partially along an axis perpendicular to a main surface of the native component carrier.

Descriptively speaking, according to this embodiment the capacitor device is at least a portion of a layered structure of the component carrier. Specifically, at least a portion of an upper conductive layer may form the first electrode of the capacitor device, an insulating layer may form the dielectric layer, and at least a portion of a lower conductive layer may form the second electrode of the capacitor device. If applicable, other portions of the conductive layer may be used for other purposes, in particular for building up conductor paths for electronic assemblies.

Depending on the specific application the (two-dimensional) shape of the electrodes may be selected in a proper way. In particular, it is not essential that the shapes and/or the sizes of the two electrodes are the same. Although a large spatial overlap between the two electrodes may be desired in most cases. However embodied the electrodes are spatially arranged in such a manner that an electric field can be generated within the electrically insulating layer portion between the two electrodes.

In an embodiment, the electrically insulating layer portion comprises at least one of the group consisting of resin (such as reinforced or non-reinforced resins, for instance epoxy resin or Bismaleimide-Triazine resin, more specifically FR-4 or FR-5), cyanate ester, polyphenylene derivate, glass (in particular glass fibers, multi-layer glass, glass-like materials), prepreg material, polyimide, polyamide, liquid crystal polymer (LCP), epoxy-based Build-Up Film, polytetrafluoroethylene, a ceramic, and a metal oxide. Reinforcing materials such as webs, fibers or spheres, for example made of glass (multilayer glass) may be used as well. Although prepreg or FR4 are usually preferred, other materials may be used as well.

In a further embodiment, the electrically conductive layer portions comprise at least one of the group consisting of copper, aluminum, nickel, silver, gold, palladium, and tungsten. Although copper is usually preferred, other materials or coated versions thereof are possible as well, in particular materials coated with supra-conductive material such as graphene, or structures such as nanowires or nanotubes.

According to a further embodiment of the invention, at least a portion of the native component carrier, which portion is associated with the capacitor device, is free of an embedded and/or surface mounted component. This may provide the advantage that the desired function of the capacitor device, namely to change its capacitance value with a change of the actual value of the physical quantity, will not be disturbed by components being located within or close to an active region of the capacitor device.

According to a further embodiment of the invention the step of measuring a capacitance value comprises (a) measuring a resonance frequency of an electric resonance circuit comprising the capacitor device; and (b) calculating the capacitance value based on the measured resonance frequency. This may provide the advantage that the capacitance value and, as a consequence, also the actual value of the physical quantity, can be determined with an extraordinary high accuracy. In this context benefit may be taken from the fact that generally frequencies can be measured very precisely.

In a preferred embodiment the resonance circuit is a simple LC circuit comprising an inductor L and the capacitor device C (and an optional resistor R). Thereby, it is not necessary that the inductor L is a dedicated electric component. In many applications it is sufficient if the inductor L and/or the resistor R is realized by at least a section of a conductor path connecting the capacitor device C.

According to a further embodiment of the invention the physical quantity to be determined is at least one of temperature and humidity. This may provide the advantage that the described native component carrier can be used for a variety of different applications. One promising application may be for instance the field of agriculture where physical quantities being important for the growth of plants can be monitored precisely with simple and inexpensive technical equipment.

According to a further embodiment of the invention the native component carrier comprises (a) a first portion being associated with the capacitor device and (b) a second portion being associated with a further capacitor device of the native component carrier. The capacitance of the capacitor device is given by a first function depending on the physical quantity and a further physical quantity and the capacitance of the further capacitor device is given by a second function depending on the physical quantity and the further physical quantity. The second function is different from the first function. This embodiment may provide the advantage that in addition to determining (the value of) one physical quantity (a further value of) a further physical quantity can be simultaneously determined by means of a suitable data processing of the two capacitance values. Thereby, the data processing may involve answering a system of two equations having together two unknown variables.

It is mentioned that it is also possible to use for one capacitor device a specific material having a permittivity or dielectric constant, Dk, or a dielectric tangent, Df, which only depends on one physical quantity and for the other capacitor device a specific material having a Dk or Df, which depends on both physical quantities. This may provide the advantage that the corresponding system of two equations can be solved in a very simple manner because one equation only depends on a single physical quantity.

In presently preferred embodiments the first portion is used for measuring a function of temperature and humidity and the second portion is used for measuring another function of temperature and humidity. This may provide the advantage that a capacitive sensor, respectively a compact capacitive transducer being capable of measuring simultaneously two different physical quantities can be realized in a compact and cost effective manner.

According to a further embodiment of the invention the first capacitor device comprises a first dielectric material (being sandwiched between two electrically conductive layers) and the second capacitor device comprises a second dielectric material (also being sandwiched between two electrically conductive layers), wherein the second dielectric material is different from the first dielectric material.

The first dielectric material may be for instance an electrically insulating material which is usually used for PCBs, substrates or semiconductor packaging. As has already been mentioned above, such a material may comprise for instance resin and/or glass fibers, so-called prepreg or an FR4 material. The second dielectric material may be for instance a so called high-frequency (HF) PCB material which is known to be used for high frequency PCB applications. Suitable HF insulating materials may be, e.g., polytetrafluoroethylene, liquid crystal polymer and/or cyanate ester resins.

Generally speaking, in preferred embodiments the two different dielectric materials exhibit different frequency behaviors, wherein in particular the dielectric value as a function of frequency is different. The actual values of the two different physical quantities can simply be calculated from capacitance value data which have been obtained at two or more different frequencies.

In some embodiments the two different dielectric materials are assigned to one and the same insulating layer of a PCB being realized as a single or a multilayer structure. The electrodes of the corresponding capacitor device may be formed by an appropriate structuring of the conductive layers sandwiching the insulating layer.

According to a further embodiment of the invention the native component comprises at least two electrically insulating layers, wherein the first dielectric material is assigned to a first electrically insulating layer and the second dielectric material is assigned to a second electrically insulating layer being different from the first electrically insulating layer. The second portion of the native component carrier being assigned to the capacitor device may be formed over the first portion being assigned to the further capacitor device. This may provide the advantage that the described native component carrier can be realized in a particular compact design.

This embodiment of the invention can be realized easily with a multilayer component carrier which comprises a stack of at least two electrically insulating layers and at least three electrically conductive layers, wherein each electrically insulating layer is covered on opposed surfaces (or sides) with an electrically conductive layer. For example, the component carrier may be a laminate of the mentioned electrically insulating layers and the electrically conductive layers, in particular formed by applying mechanical pressure, if desired supported by thermal energy. The mentioned stack may provide a plate-shaped component carrier capable of providing a large mounting surface for further components and being nevertheless very thin and compact. The term "layer" may particularly denote a continuous layer, a patterned layer or a plurality of non-consecutive islands within a common plane.

According to a further embodiment of the invention the native component carrier further comprises a third portion being associated with another further capacitor device of the native component carrier, wherein the capacitance of the another further capacitor device is given by a third function depending on (i) another further physical quantity and (ii) at least one of the physical quantity and the further physical quantity. The third function is different both from the second function and from the first function. This may provide the advantage that one more physical quantity can be determined. In this embodiment a proper data processing may involve answering a system of three equations having together three unknown variables.

It is mentioned that there is no principal limitation with regard to the number of different physical quantities which can be simultaneously determined. It is only necessary to provide a corresponding number of different portions of the native component carrier and to solve a system of equations with a corresponding number of unknowns.

According to a further embodiment of the invention the native component carrier comprises a plurality of capacitor devices which are spatially distributed within the native component carrier along directions being parallel to a main surface of the native component carrier. In this embodiment the method comprises (a) stimulating the plurality of capacitor devices; (b) measuring the capacitance values of the plurality of capacitor devices; and (c) determining a spatially dependent temperature profile within the native component carrier. This may provide the advantage that temperatures of an entire electronic assembly being built up at and/or at least partially within the native component carrier can be monitored. With this information thermal loads of several electronic components can be observed and potential failures can be forecasted with a high reliability.

According to presently preferred embodiments, the plurality of capacitor devices are assigned to or share one common electrically insulating layer. In case of a planar component carrier this means that the capacitor devices share a plane or are arranged within one and the same plane.

According to a further embodiment of the invention the physical quantity is the temperature of an electronic component which is mounted to or embedded within the native component carrier and which is thermally coupled to the capacitor device. This may provide the advantage that for determining the temperature of an electronic component being part of an electronic assembly which is built up at least partially at or within the native component carrier it is no longer necessary to provide a dedicated temperature sensor which is thermally coupled to the electronic component. A simple and cost effective monitoring of the actual temperature of the electronic component can be realized with a native component carrier deploying one of the disclosed or similar arrangements.

The electronic component may be in particular an active electronic component such as a packaged integrated circuit or a data processor. Of course, also the temperature of other components such as a capacitor, a diode etc., which are thermally coupled to the capacitor device, can be monitored.

According to a further aspect of the invention there is provided a method of controlling the operation of an electronic component, in particular an integrated circuit chip. The provided method comprises (a) performing the method for determining a physical quantity and (b) operating the electronic component in dependency from the determined physical quantity.

This aspect of the invention is based on the idea that for controlling the operation of an electronic component the (native) component carrier at which the electronic component is mounted and/or within which the electronic component is at least partially embedded can be used as a sensor for the respective physical quantity.

Preferably, the physical quantity is again the temperature of the capacitor device, which, when the capacitor device is thermally coupled with the electronic component, is indicative for the (operating) temperature of the electronic component.

In case the electronic component is a data processor chip the operation may be characterized in particular by a clock rate. If the temperature of the chip exceeds a predefined limit, the heat load for the chip may be reduced by reducing the clock rate. Thereby, the reduction of the clock rate may be chosen such that the temperature of the chip drops. With this measure an unwanted overheating of a microprocessor chip can be prevented based on a local temperature measurement within the (native) component carrier.

According to a further aspect of the invention there is provided a sensor arrangement for determining a physical quantity. The provided sensor arrangement comprises (a) a native component carrier comprising a capacitor device being formed within the native component carrier, wherein the capacitor device is configured as a transducer for converting the physical quantity into a measurable parameter indicative of a capacitance value of the capacitor device; and (b) a measurement unit configured for measuring the measurable parameter indicative of the capacitance value.

Also the provided sensor arrangement is based on the idea that (at least a portion of) the native component carrier can be directly used as a capacitive sensor for sensing the actual value of the physical parameter respectively for converting or transducing a stimulated input signal into a value of a measurable parameter in such a manner that a signal provided by the measurement unit is indicative for the actual value of the physical quantity. The sensor arrangement may be configured for carrying out a method as described above.

According to a further embodiment of the invention the sensor arrangement further comprises a frequency generator, which is electrically coupled to the capacitor device and which is configured for stimulating the capacitor device with a driving signal. In this embodiment (i) the capacitor device forms a part of a resonance circuit transducing the driving signal into an output signal and (ii) the measurement unit is configured for receiving the output signal and for measuring a response of the resonance circuit to a frequency scan performed by the frequency generator. This may provide the advantage that the value of the physical quantity can be determined very precisely.

In a plot showing the response in a diagram wherein along the axis of abscissa the frequency and along the axis of ordinate the amplitude of the output signal are depicted, there can typically be seen a peak defining the resonance frequency of the transducer. From the frequency value of this peak the capacitance value of the capacitor device can be calculated. As stated above, from the capacitance value the actual value of the physical quantity can be derived.

The frequency generator and measurement unit may be embodied as two individual chips or as one common chip which may be mounted to or embedded within the native component carrier. In any way, the described sensor arrangement can be realized in a simple and cost effective manner.

According to a further embodiment of the invention the sensor arrangement further comprises a wireless communication unit attached to the native component carrier and communicatively connected to the measurement unit. The wireless communication unit is configured for transmitting a signal being indicative for the (the actual value of a) physical quantity. This may provide the advantage that the sensor arrangement can communicate with a suitable receiver which may further process the signal transmitted in a wireless manner. No further cable or conductor path connections are necessary.

The wireless communication unit may be for instance a Radio Frequency Identification (RFID) tag. The RFID tag may be an active one which is powered by a (rechargeable) battery being preferably also a part of the described sensor arrangement. Alternatively, the RFID tag may be a passive one which, in operation, is powered by a driving RF signal of an RFID reader device. In some preferred embodiments the RFID tag performs a so called energy harvesting, wherein from an RF field generated by a RFID reader device there is harvested an amount of power which is sufficient not only for operating the RFID tag and respectively the wireless communication unit but also for operating the frequency generator and/or the measurement device. In this way a completely autonomous wireless sensor arrangement can be realized.

According to a further aspect of the invention there is provided a method of using a native component carrier as a transducer for converting (the actual value of) a physical quantity to be detected into a measurable parameter being indicative of a capacitance value of at least a part of the component carrier. As has already been mentioned above, the physical quantity may be in particular the temperature of a capacitor device having the capacitance value. Alternatively or in combination, the physical quantity may be another environmental parameter such as the humidity to which the capacitor device is subjected.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the illustrated examples described hereinafter and are explained with reference to the illustrated embodiments. The invention will be described in more detail hereinafter with reference to these illustrated embodiments to which the invention is not limited.

DETAILED DESCRIPTION OF ILLUSTRATED EMBODIMENTS

The illustrations in the drawings are schematically presented. It is noted that in different figures, similar or identical elements or features are provided with the same reference signs or with reference signs, which are different from the corresponding reference signs only within the first digit. In order to avoid unnecessary repetition elements or features which have already been described with respect to a previously illustrated and described embodiment are not elucidated again later.

Before describing specific embodiments of the invention some basic technical considerations are explained to provide a better and easier understanding of the invention. In this section reference is made predominately to an application of a native component carrier as a temperature sensor and respectively, a temperature dependent transducer. However, it should be clear that also other physical quantities such as humidity can be determined and in some arrangements two or more physical quantities can be simultaneously determined.

A typical capacitor consists of two conductors separated from each other by a non-conductive region. The non-conductive region is called the dielectric. In simpler terms, the dielectric is just an electrical insulator. Examples of dielectric media are glass, air, paper, vacuum, a depleted semiconductor region etc. A capacitor is assumed to be self-contained and isolated, with no net electric charge and no influence from any external electric field. The conductors thus hold equal and opposite charges on their facing surfaces, and within the dielectric there develops an electric field. In SI units, a capacitance of one Farad means that for a capacitor having plate shaped electrodes one coulomb of charge on each conductor causes a voltage of one volt across the capacitor. The capacitance is given by the relation $C=\varepsilon \cdot A/d$, where "$\varepsilon$" is the dielectric constant (DK) of the dielectric medium. "A" is the area of the capacitor plates and "d" is the distance between the capacitor plates. Therefore, the capacitance is large in capacitors made from materials with a high dielectric constant, large plates, and a small distance between plates.

A capacitor can be formed within a native component carrier, wherein an insulating layer portion corresponds to the dielectric medium and metallic layer portions sandwiching the insulating layer portion correspond to the capacitor plates.

A capacitor is an important component for resonance circuits such as, e.g., RC- and RLC-circuits. RC circuits can be used to filter a signal by blocking certain frequencies and passing others. The two most common RC filters are High-pass filters and Low-pass filters. Band-pass filters and Band-stop filters usually require RLC-circuits.

In physics and electrical engineering, a cut-off frequency is a boundary in a system's frequency response at which energy flowing through the system begins to be reduced (attenuated or reflected) rather than passing through. For example, the cut-off frequency of an RC circuit is given by the equation $f_{cut-off}=1/2\pi RC$, where R is the resistance and C is the capacitance of the circuit. It should be clear that by measuring the cut-off frequency $f_{cut-off}$ or any other frequency response of a circuit comprising a capacitor, (the value of) any physical quantity having an influence on the DK could be determined.

In preferred applications of embodiments of the invention the physical quantity "temperature" is determined. In this context it has been recognized by the inventors that for electrically insulating materials used for Printed Circuit Boards (PCB) such as the material FR4 there is a pronounced temperature dependency of the DK.

Figure 1:
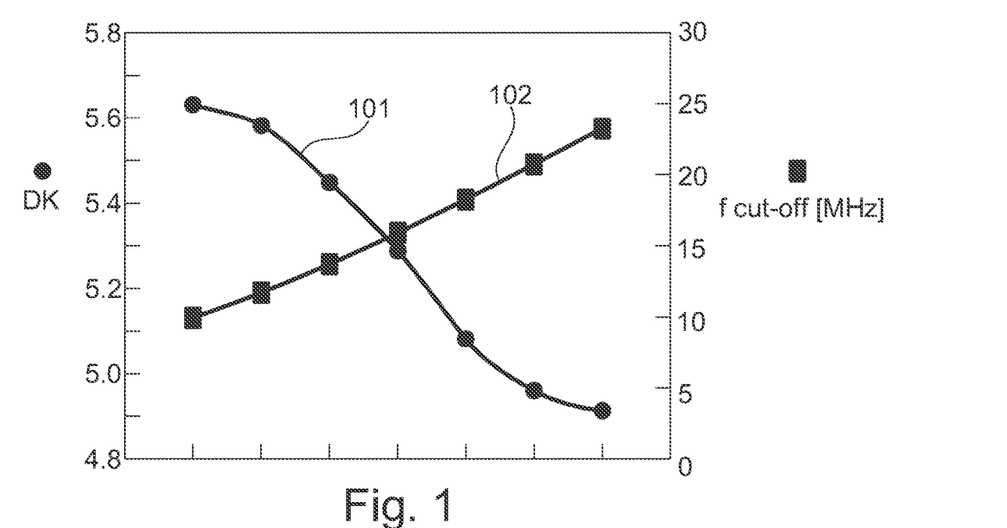
FIG. 1 illustrates the variation of the DK of FR4 with temperature.

FIG. 1 shows as an example experimental data of the variation of the DK of FR4 with temperature. The corresponding measurement data have been obtained with a frequency of 1 MHz. Since the variation of the capacitance "C" of a capacitor with FR4 as dielectric medium is directly proportional to the variation on DK as function of the temperature, the cut-off frequency will vary inversely to C. In FIG. 1, DK as a function of temperature is depicted with curve 101, the cut-off frequency $f_{cut-off}$ as a function of the temperature is depicted curve 102. The cut-off frequency has been calculated for a typical PCB with a thickness d of the electrically insulating layer being 50 μm and an area A of the two electrically conductive layer portions representing the capacitor plates being 50 μm×50 μm.

The gradient of curve 101 over the full line gives a demonstration of how accurate such temperature sensor can be. In order to obtain an even better accuracy the dimensions of the capacitor (device) formed within the PCB can be adapted. In preferred embodiments a native PCB based thermometer will be mainly based on readings of the cut-off frequencies of a RC-circuit (or a RLC-circuit for more sophisticated applications), wherein the capacitor's capacitance "C" is a function of the temperature (due to the variations of the material's DK as a function of the temperature).

As has already been mentioned above, also humidity has an influence of the DK of typical PCB insulating materials such that a humidity sensor can be built up with the same setup as being used for a native PCB temperature sensor. A hybrid temperature-humidity sensor will be described further below.

A capacitor device being integrated within a native PCB can be built in many ways. FIGS. 2A to 2D show by way of example five possible configurations A, B1, B2, C, and D of a capacitor device which can be realized via a standard PCB manufacturing processes and which are integrated within a native component carrier 210 being realized as a PCB. Metallic portions of the capacitor devices are denominated with reference numeral 216. The corresponding electrically conductive metallic materials are respectively illustrated in a cross-hatched manner. Electrically insulating portions are denominated with reference numeral 212. In the upper part of FIGS. 2A to 2D top views are shown. In the lower part of FIGS. 2A to 2D the corresponding cross-sectional views are shown.

Figures 2A, 2B, 2C:
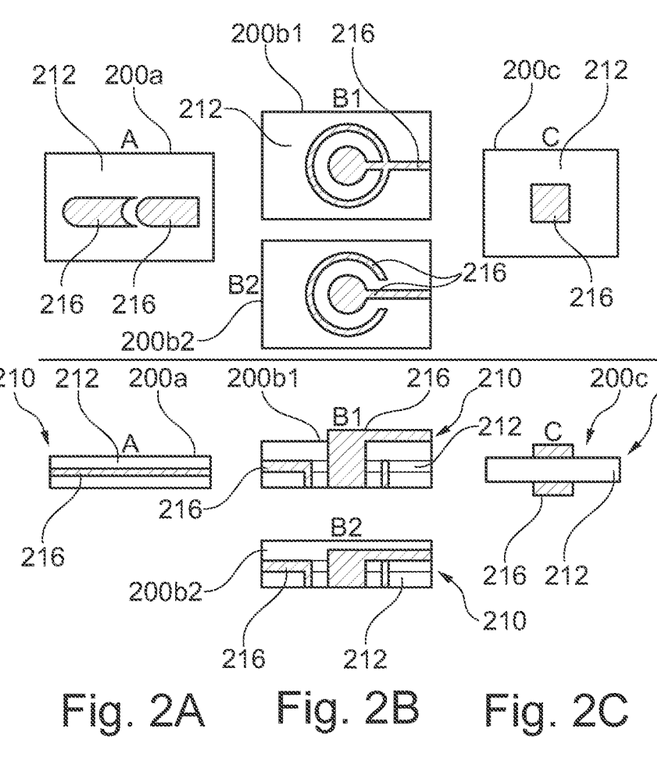
FIGS. 2A, 2B, 2C and 2D show example configurations of a capacitor device formed within a PCB.

FIG. 2A shows a first configuration A of a capacitor device 200a with simply two copper traces separated by a gap. Each copper trace may have a height of 5 to 50 μm (=50×10$^{-6}$ m). The gap, which is filled with dielectric material, may have a size of 10 to 500 μm. It is pointed out that in this particular embodiment and by contrast to all other embodiments illustrated in this document the two copper traces are assigned to the same layer of a PCB layer structure having a metallic layer sandwiched between two electrically insulating layers. It is pointed out that the depicted structure forming the capacitor device 200a may be only a select portion of a multilayer PCB having further metallic layers and/or further electrically insulating layers. This also holds true for the other configuration B1, B2, C, and D depicted in FIGS. 2B to 2D.

FIG. 2B shows two other configurations B1 and B2 for capacitor devices 200b1 and 200b2, respectively, in which the concept of a "via in via" is used. The capacitor devices 200b1 and 200b2 are formed with a combination of a copper via with a plugged plated-through hole (PTH).

FIG. 2C shows a configuration C with a capacitor device 200c with two parallel plates having a 100% spatial overlap along a direction perpendicular to the plane of the drawing (in the upper part of FIG. 2C) and vertical (in the lower part of FIG. 2C). In operation, the electric field of the capacitor device 200c will predominately develop in the entire region between the two parallel plates which are formed with copper pads.

Figure 2D:
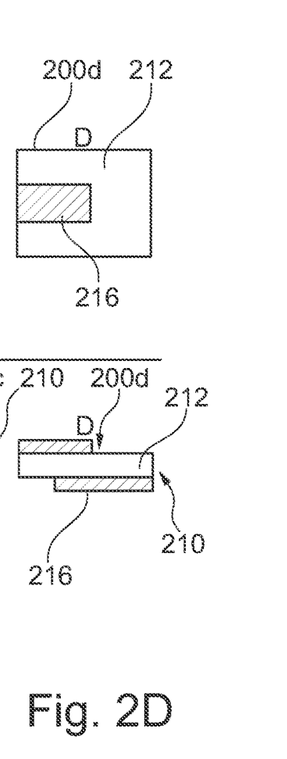

FIG. 2D shows a configuration D with a capacitor device 200*d* with two parallel plates having a spatial overlap being significantly smaller than 100%. The electric field of the capacitor device 200*d* will develop predominately within the region being associated with the overlapping area of two copper pads forming the two parallel plates which are offset with respect to each other.

The described configurations can be implemented in different manners. In an exemplary implementation the capacitor device is integrated directly in a rigid and/or flexible PC of a larger electronic assembly or electronic circuit such as e.g. a graphic card of a computer. The capacitor device can be directly connected to the circuit of the card and monitor the temperature in the card locally. In another exemplary embodiment a PCB-sensor with an integrated capacitor device can be diced and integrated to another electronic assembly built up or constructed at or with another PCB. Further, as will be illustrated further below, a complete RFID system can be printed on a rigid or flex PCB board and then be diced. Of course, also other implementations may be possible.

Figure 3:
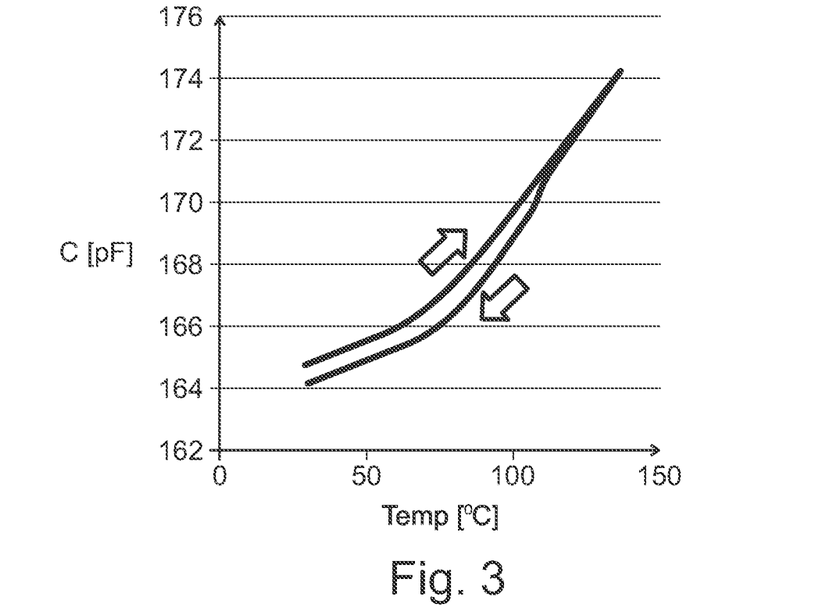
FIG. 3 illustrates the capacitance of a PCB-formed capacitor as a function of temperature.

FIG. 3 shows measurements of the capacitance of a PCB-formed capacitor as a function of temperature. A parallel plate capacitor was built up using copper and an organic PCB material. The dielectric material used for the capacitor device was a porous Polyethersulfone (PES) with copper.

It is mentioned that the small sign of hysteresis in the capacitance curve is caused by instabilities in the measurement set up, thermal dilation of the involved materials etc. In any case, the experimental data show that at least for high temperatures above 100° C. the temperature measurement is extremely stable. The stability and measurement ranges for different thermometers must be defined by the dielectric materials to be chosen. The accuracy of a corresponding thermometer will depend on the electric circuit implemented for the RC- or RLC-circuit as well as on the dielectric material and the capacitor geometries chosen.

Figure 4:
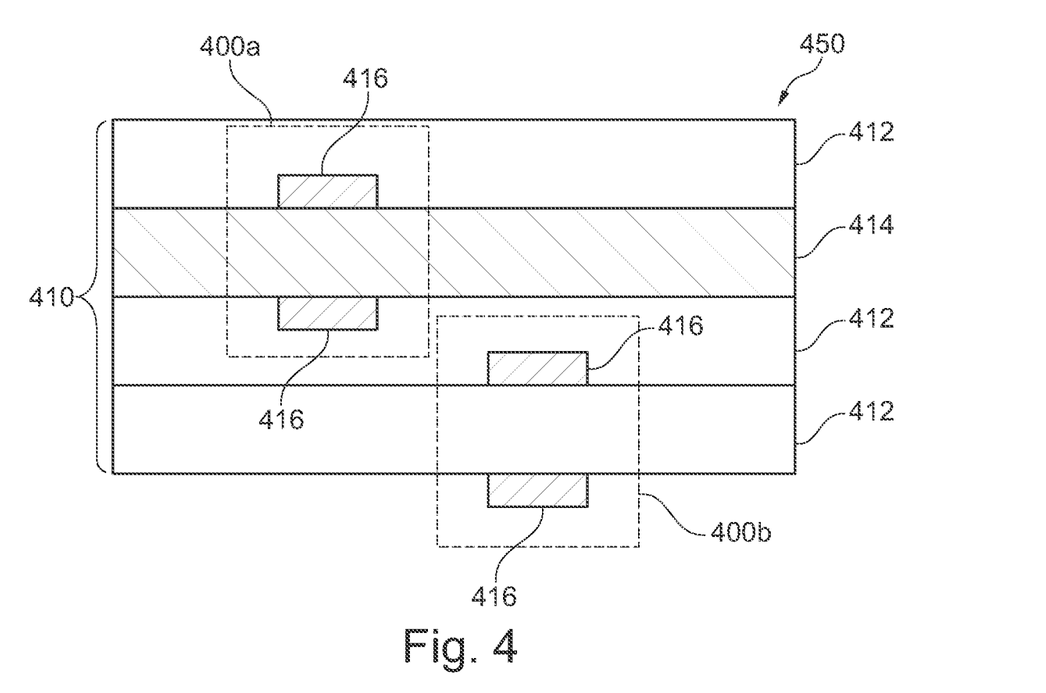
FIG. 4 illustrates an embodiment of a hybrid build-up PCB capacitor system with two different capacitor devices.

FIG. 4 illustrates a design for a hybrid build-up PCB capacitor system 450 wherein two capacitor devices 400*a* and 400*b* are integrated within one multilayer PCB 410. According to the embodiment described here the multilayer PCB 410 comprises several electrically insulating layers which are made from a usual PCB material comprising materials such as for example resin and/or glass fibers, so-called prepreg or an FR4 material. Further, the multilayer PCB 410 comprises a High Frequency (HF) insulating layer 414 which is a material known for use in PCBs for high frequency applications. Suitable HF insulating materials may be e.g. polytetrafluoroethylene, liquid crystal polymer and/or cyanate ester resins. Further, two (structured) electrically conductive layer portions are used as electrode plates 416 of the capacitor devices 400*a* and 400*b*.

In the depicted embodiment the HF insulating layer 414 is used as a humidity-stable layer, i.e. the DK of the respective HF insulating material does not, or only in a negligible manner, depend on the humidity. Therefore, with the capacitor device 400*a* only the actual temperature is measured. By contrast thereto, conventional epoxy-based electrically insulating materials used for the layers 412 have a DK which depends on both humidity and temperature. Once the actual temperature is known from the HF insulating layer based first capacitor device 400*a*, it is then possible to use the measured temperature value as a reference for the second epoxy-based capacitor device 400*b*. The temperature influence on the second epoxy-based capacitor device 400*b* can then be compensated, isolating and retrieving information on humidity levels to which the entire multilayer PCB 410 is exposed.

Figure 5:
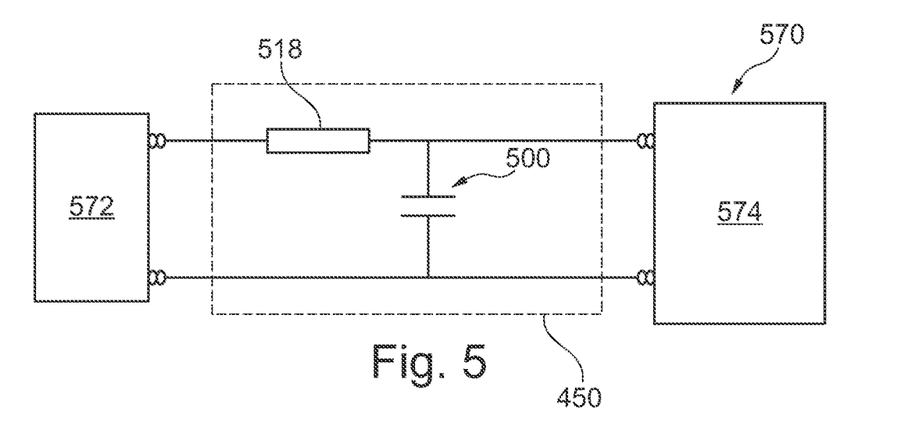
FIG. 5 shows an embodiment of a sensor arrangement with a PCB capacitor system comprising a RC-circuit.

FIG. 5 shows a schematic illustration of a sensor arrangement 570 according to a preferred embodiment of the invention. The sensor arrangement 570 comprises PCB capacitor system 450 having an integrated capacitor device 500 and an integrated resistor 518 which are connected by appropriate electric conductor paths in order to form a RC-circuit. The RC-circuit is driven by a frequency generator 572 which stimulates the RC-circuit with an AC signal with varying AC frequencies. At the output of the RC-circuit there is connected a measurement unit 574 which measures the frequency response of the PCB capacitor system 450. It is mentioned that the PCB capacitor system 450 acts as a transducer which modifies the incoming AC signal wherein the modification depends on the actual value of the physical quantity, in the present case temperature, to which the PCB capacitor system 450 is subjected.

It is mentioned that the frequency generator 572 and/or the measurement unit 574 can be realized with dedicated integrated circuits being realized with individual semiconductor chips. In this case the PCB capacitor system 450 can be realized in a simple and very compact manner. Alternatively, at least one of the frequency generator 572 and/or the measurement unit 574 can be realized or integrated within a larger PCB.

Figure 6:
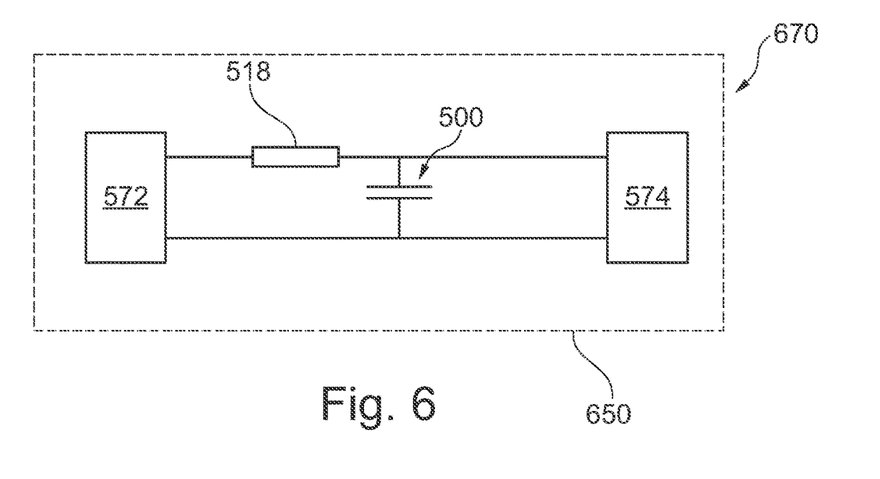
FIG. 6 shows an embodiment of a PCB board with a fully integrated sensor arrangement.

FIG. 6 schematically illustrates a configuration wherein both the frequency generator 572 and the measurement unit 574 (and also the capacitor device 500 and the resistor 518) are integrated within a larger PCB board 650.

Figure 7:
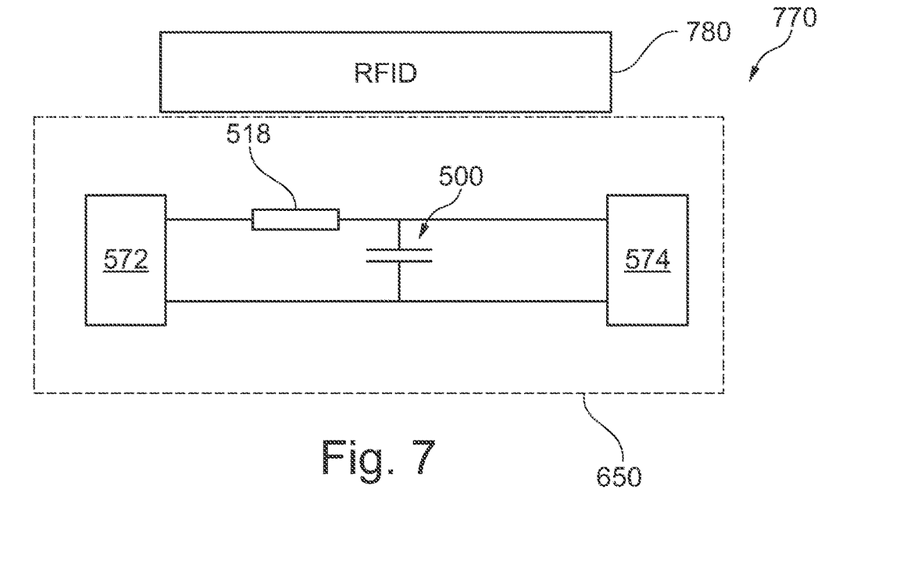
FIG. 7 shows an embodiment of a sensor arrangement with an attached RFID communication unit.

FIG. 7 schematically illustrates a configuration wherein an autonomous sensor arrangement 770 comprises, in addition to all components being used for the sensor arrangements 570, 670, a wireless communication unit 780 which is attached to the PCB board 650 preferably by means of surface mounting. Of course, the wireless communication unit 780, which according to the exemplary embodiment described here is a RFID transmitter, can also be integrated within the PCB board 650.

Remote temperature readings can be determined with a described sensor using a RLC-circuit in which a temperature dependent capacitor device 500 is used. The remote temperature readings may be communicated via RF with an antenna (not shown). This configuration can be energized in an active configuration with a battery powering the system, or in a wireless passive configuration, wherein all power is retrieved from an external RF field via energy harvesting.

Figure 8:
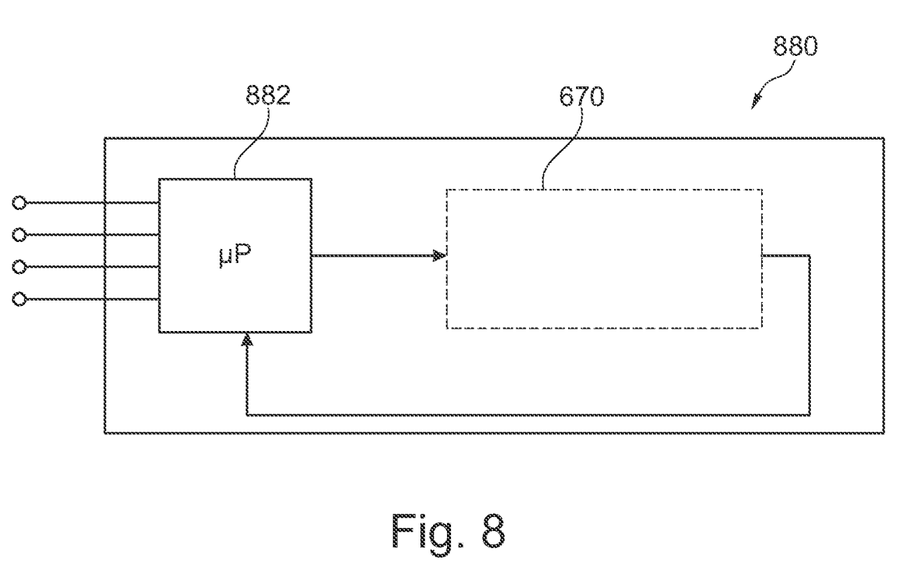
FIG. 8 shows an embodiment of a motherboard with a temperature controlled data processor.

FIG. 8 schematically shows a motherboard 880 wherein, according one aspect of the invention there is realized a temperature dependent control of the operation of a semiconductor chip 882. According to the exemplary embodiment described here the semiconductor chip 882 is a data processor. The operating temperature is measured via a sensor arrangement 670 which, together with the semiconductor chip 882, is mounted to or integrated within the motherboard 880 and which is thermally coupled to the semiconductor chip 882. In this embodiment, a temperature control for preventing an overheating is realized by controlling a clock rate of the data processor 882. If the temperature of the data processor 882 increases the clock rate is reduced.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS

101 DK function
102 $f_{cut-off}$ function
200a,b,c,d capacitor devices
210 native component carrier/PCB
212 insulating layer portions
216 electric layer portions
400a,b first/second capacitor device
410 multilayer PCB
412 insulating layer
414 HF insulating layer
416 electrode plates
450 PCB capacitor system
500 capacitor device
518 resistor/resistor and coil combination
570 sensor arrangement
572 frequency generator
574 measurement unit
650 PCB board
670 sensor arrangement
770 sensor arrangement
780 wireless communication unit
880 motherboard
882 semiconductor chip/data processor

The invention claimed is:

1. A method for determining a physical quantity, the method comprising:
    stimulating a capacitor device being formed within a native component carrier;
    measuring a capacitance value of the capacitor device; and
    determining the physical quantity based on the measured capacitance value;
    wherein the capacitor device is formed by two electrically conductive layer portions and an electrically insulating layer portion being placed between the two electrically conductive layer portions, wherein along an axis being perpendicular to a main surface of the native component carrier the two electrically conductive layer portions overlap with each other at least partially.

2. The method as set forth in claim 1, wherein at least a portion of the native component carrier, which portion is associated with the capacitor device, is free of an embedded and/or surface mounted component.

3. The method as set forth in claim 1, wherein measuring a capacitance value comprises measuring a resonance frequency of an electric resonance circuit comprising the capacitor device; and
    calculating the capacitance value based on the measured resonance frequency.

4. The method as set forth in claim 1, wherein the physical quantity to be determined is at least one of temperature and humidity.

5. The method as set forth in claim 1, wherein the native component carrier comprises a first portion being associated with the capacitor device and
    a second portion being associated with a further capacitor device of the native component carrier,
    wherein the capacitance of the capacitor device is given by a first function depending on the physical quantity and a further physical quantity and the capacitance of the further capacitor device is given by a second function depending on the physical quantity and the further physical quantity,
    wherein the second function is different from the first function.

6. The method as set forth in claim 5, wherein the first capacitor device comprises a first dielectric material and the second capacitor device comprises a second dielectric material, wherein the second dielectric material is different from the first dielectric material.

7. The method as set forth in claim 5, wherein the native component carrier comprises at least two electrically insulating layers, wherein the first dielectric material is assigned to a first electrically insulating layer and the second dielectric material is assigned to a second electrically insulating layer being different from the first electrically insulating layer.

8. The method as set forth in claim 1, wherein the native component carrier comprises a plurality of capacitor devices which are spatially distributed within the native component carrier along directions being parallel to a main surface of the native component carrier, wherein the method comprises:
    stimulating the plurality of capacitor devices;
    measuring the capacitance values of the plurality of capacitor devices; and
    determining a spatially dependent temperature profile within the native component carrier.

9. The method as set forth in claim 1, wherein the physical quantity is the temperature of an electronic component which is at least one of mounted to and embedded within the native component carrier and which is thermally coupled to the capacitor device.

10. A method of controlling the operation of an electronic component, in particular an integrated circuit chip, the method comprising:
    stimulating a capacitor device being formed within a native component carrier;
    measuring a capacitance value of the capacitor device;
    determining a physical quantity based on the measured capacitance value to generate a determined physical quantity; and
    operating the electronic component in dependency from the determined physical quantity;
    wherein the capacitor device is formed by two electrically conductive layer portions and an electrically insulating layer portion being placed between the two electrically conductive layer portions,
    wherein along an axis being perpendicular to a main surface of the native component carrier the two electrically conductive layer portions overlap with each other at least partially.

11. A sensor arrangement for determining a physical quantity, the sensor arrangement comprising:
    a native component carrier comprising a capacitor device being formed within the native component carrier,
    wherein the capacitor device is configured as a transducer for converting the physical quantity into a measurable parameter indicative of a capacitance value of the capacitor device; and
    a measurement unit configured for measuring the measurable parameter indicative of the capacitance value;
    wherein the capacitor device is formed by two electrically conductive layer portions and an electrically insulating layer portion being placed between the two electrically conductive layer portions, wherein along an axis being perpendicular to a main surface of the native component carrier the two electrically conductive layer portions overlap with each other at least partially.

12. The sensor arrangement as set forth in claim 11, further comprising:

a frequency generator, which is electrically coupled to the capacitor device and which is configured for stimulating the capacitor device with a driving signal, wherein the capacitor device forms a part of a resonance circuit transducing the driving signal into an output signal, and the measurement unit is configured for receiving the output signal and for measuring a response of the resonance circuit to a frequency scan performed by the frequency generator.

13. The sensor arrangement as set forth in claim 11, further comprising:

a wireless communication unit being attached to the native component carrier and being communicatively connected to the measurement unit, wherein the wireless communication unit is configured for transmitting a signal being indicative for the physical quantity.

14. A method, comprising:

using a native component carrier as a transducer by:

detecting a capacitance value of at least a part of the component carrier, wherein the detecting is responsive to an electrically insulating layer portion between two electrically conductive layer portions wherein along an axis being perpendicular to a main surface of the native component carrier the two electrically conductive layer portions overlap each other partially in the native component carrier; and converting the capacitance value to a physical quantity.

\* \* \* \* \*